US008210163B2

(12) United States Patent
Seong

(10) Patent No.: US 8,210,163 B2
(45) Date of Patent: Jul. 3, 2012

(54) SEMI-CYLINDRICAL SOLAR COLLECTING APPARATUS FOR SOLAR BOILER

(76) Inventor: Insig Seong, Busan (KR)

( * ) Notice: Subject to any disclaimer, the term of this patent is extended or adjusted under 35 U.S.C. 154(b) by 365 days.

(21) Appl. No.: 12/520,535

(22) PCT Filed: Dec. 14, 2007

(86) PCT No.: PCT/KR2007/006555
§ 371 (c)(1),
(2), (4) Date: Jan. 12, 2010

(87) PCT Pub. No.: WO2008/075858
PCT Pub. Date: Jun. 26, 2008

(65) Prior Publication Data
US 2010/0147285 A1 Jun. 17, 2010

(30) Foreign Application Priority Data
Dec. 20, 2006 (KR) ......... 10-2006-0131143

(51) Int. Cl.
F24J 3/02 (2006.01)
F25B 27/001 (2006.01)
(52) U.S. Cl. ........ 126/585; 126/271; 126/422; 126/270; 165/45
(58) Field of Classification Search .......... 126/585, 126/422, 271, 270; 165/45
See application file for complete search history.

(56) References Cited

U.S. PATENT DOCUMENTS

| 3,470,943 A | * | 10/1969 | Van Huisen | 165/45 |
| 3,847,136 A | * | 11/1974 | Salvail | 126/592 |
| 3,937,599 A | * | 2/1976 | Thureau et al. | 417/389 |
| 4,098,264 A | * | 7/1978 | Brokaw | 126/578 |
| 4,210,125 A | * | 7/1980 | Fender | 126/587 |
| 4,401,105 A | * | 8/1983 | McAlister | 126/587 |
| 4,541,413 A | * | 9/1985 | Cannaux et al. | 126/563 |
| 4,573,327 A | * | 3/1986 | Cochran | 62/238.6 |
| 6,615,601 B1 | * | 9/2003 | Wiggs | 62/235.1 |

FOREIGN PATENT DOCUMENTS

| JP | 08-233373 | 9/1996 |
| JP | 11-256787 | 9/1999 |
| KR | 20-1999-0004111 | 1/1999 |
| KR | 10-2005-0080026 | 8/2005 |

* cited by examiner

Primary Examiner — Steven B McAllister
Assistant Examiner — Nikhil Mashruwala
(74) Attorney, Agent, or Firm — Christopher Paul Mitchell

(57) ABSTRACT

The present invention relates to a semi-cylindrical solar collecting apparatus for a solar boiler that is provided with a plurality of solar collecting plates having a semi-cylindrical shape, thereby greatly enhancing solar collecting efficiencies, and that connects a plurality of heat-exchanging pipes adapted to be heated by the plurality of solar collecting plates with an underground heat-exchanging pipe by means of auxiliary pipes, such that water is circulated well by means of a circulation pump, thereby completely solving the frozen and burst problems of the heat-exchanging pipes and circulation pipes.

3 Claims, 5 Drawing Sheets

[Fig. 1]
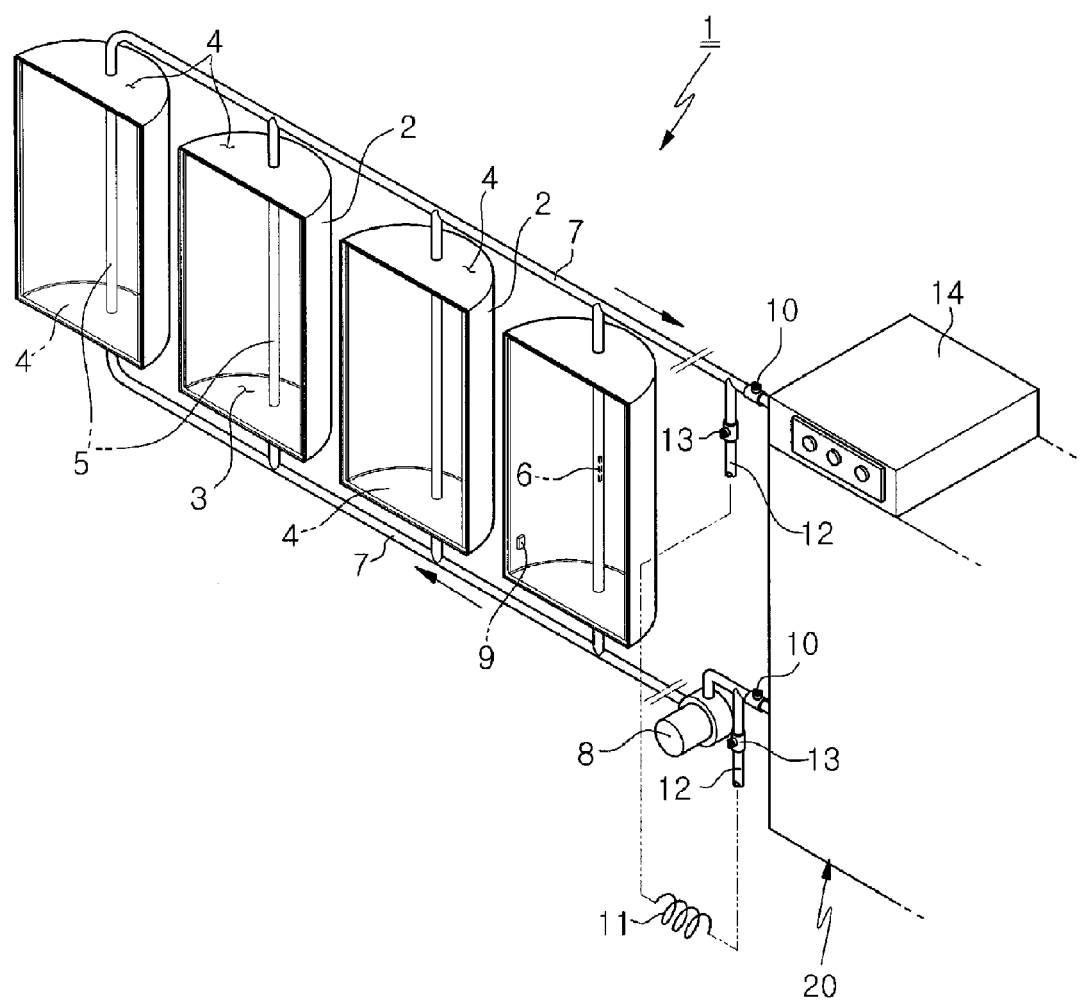

[Fig. 2]
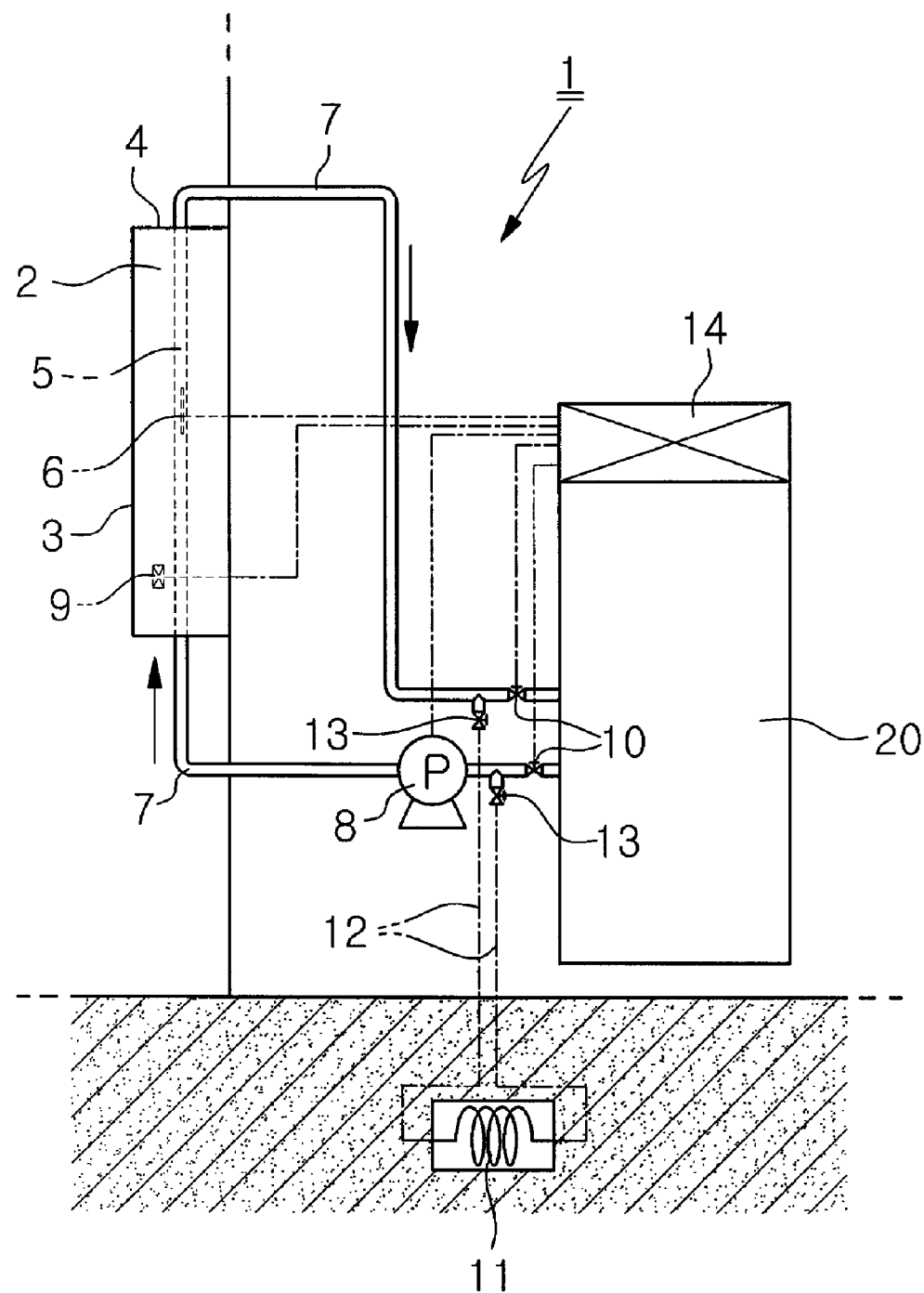

[Fig. 3]
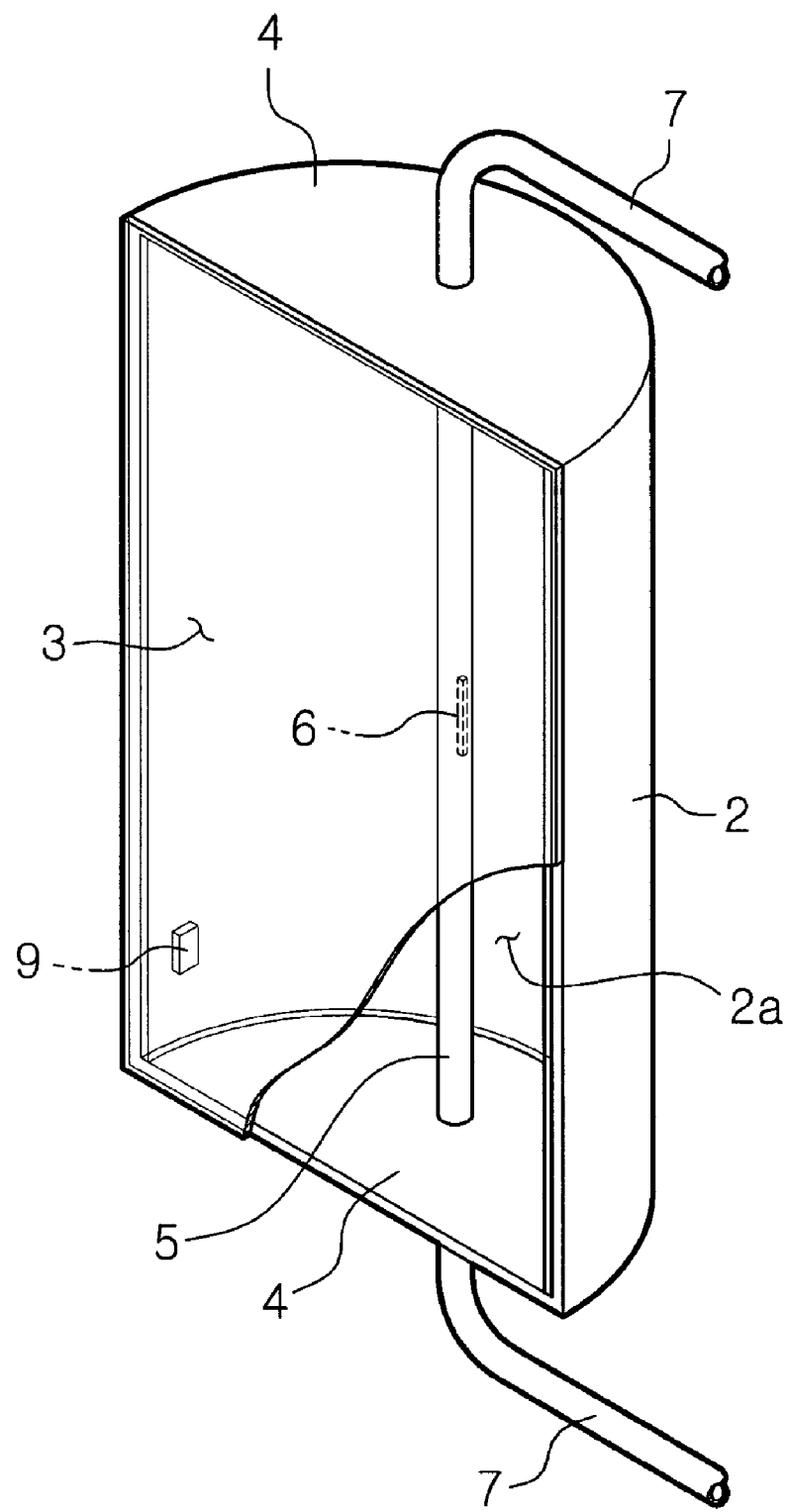

[Fig. 4]
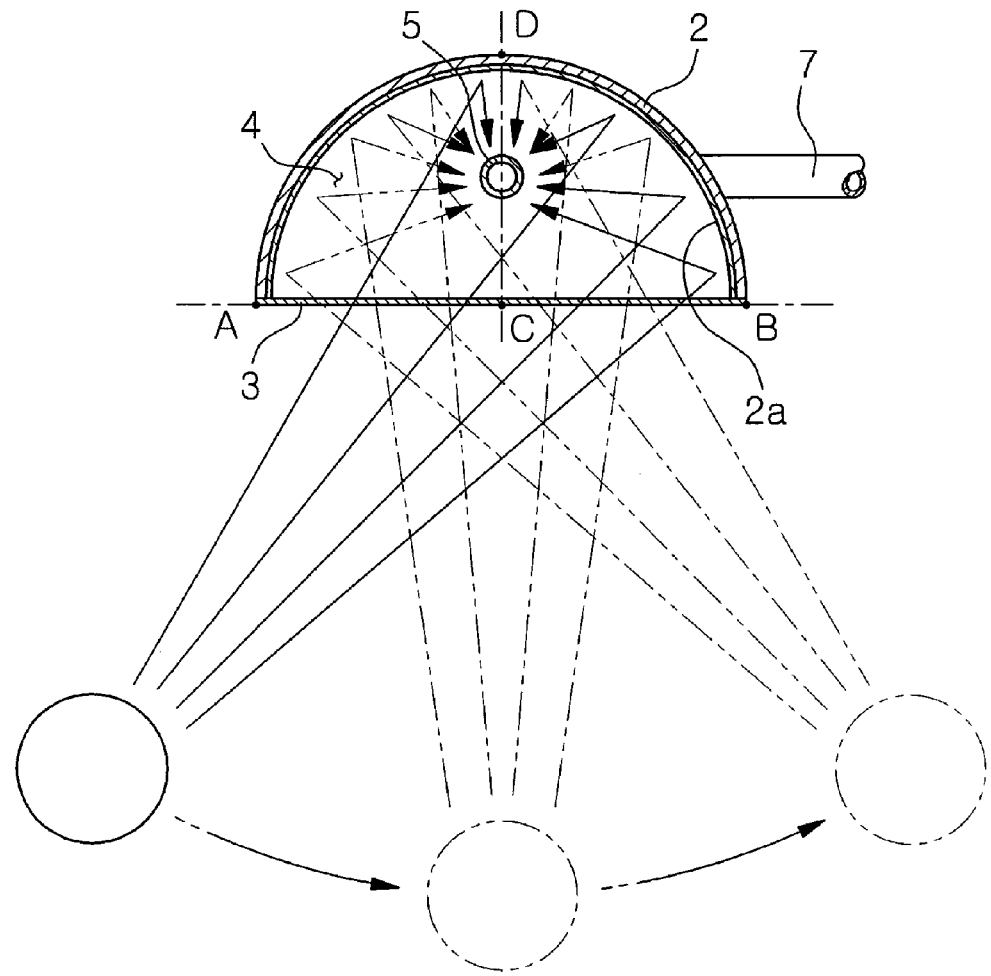
[Fig. 5]
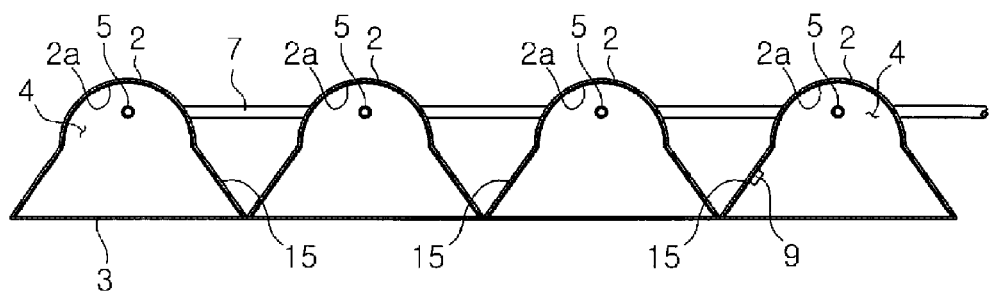

[Fig. 6]
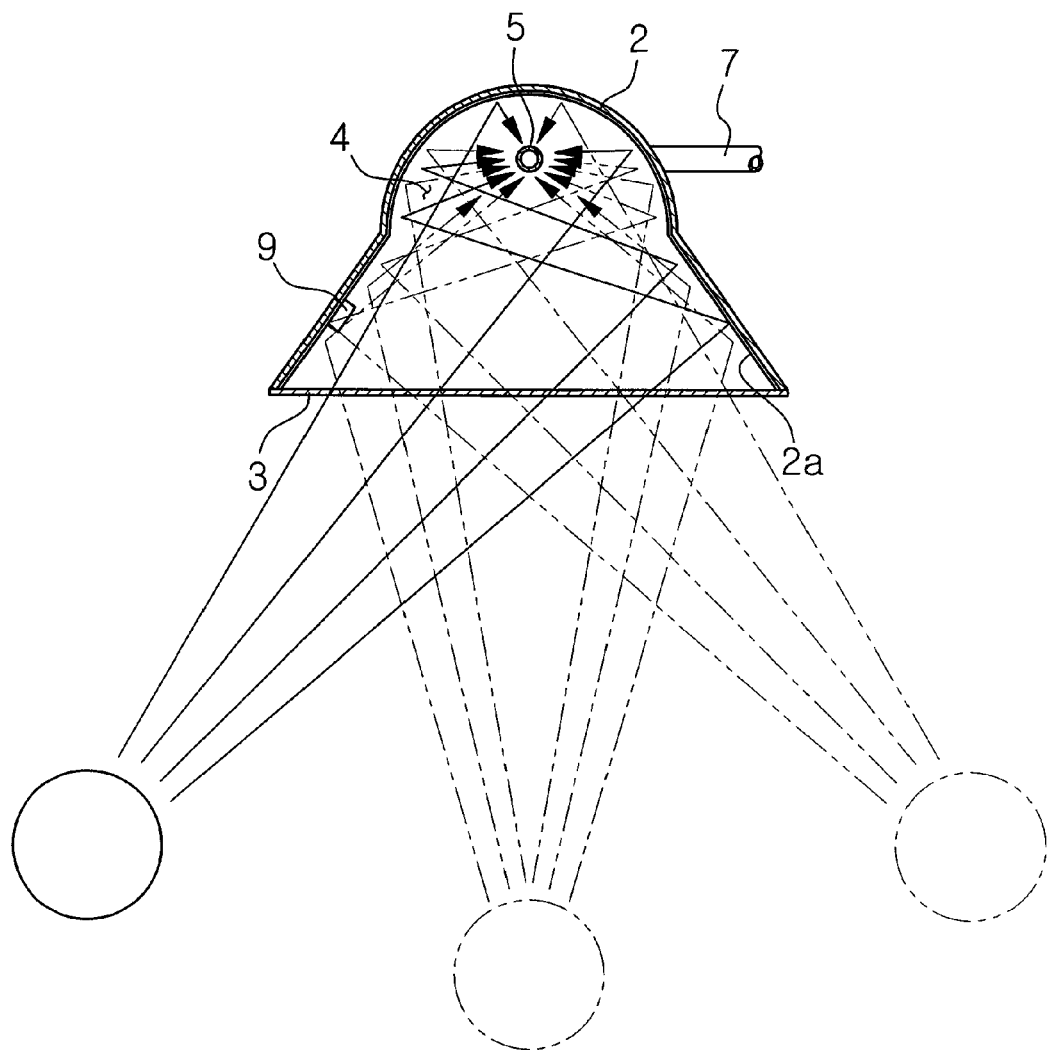

SEMI-CYLINDRICAL SOLAR COLLECTING APPARATUS FOR SOLAR BOILER

RELATED APPLICATIONS

This application is a 371 application of International Application No. PCT/KR2007/006555, filed Dec. 14, 2007, which in turn claims priority from Korean Patent Application No. 10-2006-0131143, filed Dec. 20, 2006, both of which are incorporated herein by reference.

TECHNICAL FIELD

The present invention relates to a semi-cylindrical solar collecting apparatus for a solar boiler, and more particularly, to a semi-cylindrical solar collecting apparatus for a solar boiler that is installed on a wall surface or a roof of a building, thereby providing an excellent heat-collecting efficiency, and that makes use of the heat of the earth in a winter season, thereby overcoming the frozen and burst problems.

BACKGROUND ART

A solar boiler is used to collect solar energy as one of general alternative energy sources and make use of the collected solar energy for the purpose of heating. The solar boiler absorbs the solar heat in a parallel way, but not in a serial way where the solar heat is directly collected. Then, the solar heat is used to heat water.

According to the conventional solar boilers having the above-mentioned configuration, the heating is conducted merely by absorbing solar heat and heating water, which results in a reduction in heating efficiency.

In order to address and solve these problems, thus, there has been proposed a new type solar boiler having a serial solar concentration line (which is disclosed in Korean Patent Nos. 0284103 and 0404758), filed by the same applicant as this invention, wherein a plurality of reflection mirrors are moved in accordance with the movements of the sun and the light reflected from the reflection minors is concentrated on one given position, thereby heating water to be heated.

The prior arts have an advantage in that the solar heat is concentrated to one given position to allow the water to be heated at a relatively fast speed, but the reflection mirrors should be arranged and assembled cumbersomely to a structure body. Moreover, since the structure body has to be driven as the position of the sun varies, the installation structure thereof becomes complicated, and a large area for the installation is undesirably needed. Furthermore, a heating water-supplying pipe, which is installed outside the house via solar collecting parts, may be frozen and burst in the winter season, which is difficult to install and use in general houses.

DISCLOSURE OF INVENTION

Technical Problem

Accordingly, the present invention has been made to solve the above-mentioned problems occurring in the prior art, and it is an object of the present invention to provide a semi-cylindrical solar collecting apparatus for a solar boiler that can be installed without any restriction on a place, thereby enhancing a solar concentrating efficiency, and preventing the pipe disposed outside the house from being frozen and burst in the winter season.

Technical Solution

To accomplish the above object, according to the present invention, there is provided a semi-cylindrical solar collecting apparatus for a solar boiler including: at least one solar collecting container having a semi-cylindrical shape closed at both end portions thereof by means of a side wall; a solar collecting plate disposed along the inner surface of each solar collecting container, the solar collecting plate being formed of a mirror for reflecting sunlight; a transparent cover adapted to close the front surface of each solar collecting container; a heat-exchanging pipe axially mounted in the at least one solar collecting container to pass through each solar collecting container; a heat sensor embedded into the heat-exchanging pipe of the at least one solar collecting container so as to sense a temperature of circulating water; upper and lower circulation pipes connected to one side of a storage tank so as to connect the upper and lower end portions of each heat-exchanging pipe with the storage tank; a circulation pump mounted at one side of the lower circulation pipe connected to the storage tank so as to be operated in response to the sensed signal of the heat sensor; a light sensor disposed on the inside of the at least one solar collecting container so as to sense sunlight; a first electronic valve mounted on an end portion of each of the upper and lower circulation pipes connected to the storage tank in such a manner as to be opened and closed in response to the sensed signals of the heat sensor and the light sensor; an underground heat-exchanging pipe adapted to be located under the ground in such a manner as to be connected to upper and lower auxiliary pipes, the upper auxiliary pipe extending downwardly from one end side of the upper circulation pipe in such a manner as to be adjacent to the electronic valve, and the lower auxiliary pipe extending downwardly from one end side of the lower circulation pipe in such a manner as to be located between the electronic valve mounted at the lower circulation pipe and the circulation pump; a second electronic valve mounted on each of the upper and lower auxiliary pipes in such a manner as to be opened and closed in response to the sensed signals of the heat sensor and the light sensor; and a controller for controlling the operations of the heat sensor, the light sensor, the circulation pump, and the first and second electronic valves.

Advantageous Effects

This invention discloses a semi-cylindrical solar collecting apparatus for a solar boiler that is provided with a plurality of solar collecting plates having a semi-cylindrical shape, thereby greatly enhancing solar collecting efficiencies, and that connects a plurality of heat-exchanging pipes adapted to be heated by the plurality of solar collecting plates with an underground heat-exchanging pipe by means of auxiliary pipes, such that water is circulated well by means of a circulation pump, thereby completely solving the frozen and burst problems of the heat-exchanging pipes and circulation pipes.

BRIEF DESCRIPTION OF THE DRAWINGS

FIG. 1 is a schematic perspective view showing a semi-cylindrical solar collecting apparatus for a solar boiler according to a first embodiment of the present invention;

FIG. 2 is a side view showing the semi-cylindrical solar collecting apparatus of the present invention;

FIG. 3 is a perspective view showing a partially broken state of a solar collecting container in the semi-cylindrical solar collecting apparatus of the present invention;

FIG. 4 is a plane sectional view showing an example where solar heat is collected by the solar collecting container in the semi-cylindrical solar collecting apparatus of the present invention;

FIG. 5 is a plane sectional view showing a solar collection-inducing plate mounted on a solar collecting container in a semi-cylindrical solar collecting apparatus for a solar boiler according to a second embodiment of the present invention; and FIG. 6 is a plane sectional view showing an example where solar heat is collected by the solar collection-inducing plate of FIG. 5.

BEST MODE FOR CARRYING OUT THE INVENTION

FIG. 1 is a schematic perspective view showing a semi-cylindrical solar collecting apparatus for a solar boiler according to a first embodiment of the present invention, FIG. 2 is a side view showing the semi-cylindrical solar collecting apparatus of the present invention, and FIG. 3 is a perspective view showing a partially broken state of a solar collecting container in the semi-cylindrical solar collecting apparatus of the present invention. Hereinafter, an explanation of the configuration of a semi-cylindrical solar collecting apparatus for a solar boiler according to the present invention will be given with reference to the attaching drawings.

According to the present invention, as shown, a semi-cylindrical solar collecting apparatus 1 for a solar boiler includes at least one solar collecting container 2 having a semi-cylindrical shape closed at both end portions thereof by means of a side wall 3, a solar collecting plate 2a disposed along the inner surface of the at least one solar collecting container 2 and formed of a mirror for reflecting sunlight, and a transparent cover 3 adapted to close the front surface of the at least one solar collecting container 2 and formed of a material such as glass, acryl, and the like, which allows heat efficiencies to be improved.

Of course, the solar collecting container 2 may be mounted in a single number such that water is heated, but, two or more solar collecting containers 2 are preferably arranged in parallel with one another in consideration of the heating area.

A heat-exchanging pipe 5 is axially mounted in each solar collecting container to pass through each solar collecting container 2, and a heat sensor 6 is embedded into the heat-exchanging pipe 5 so as to sense a temperature of circulating water. Upper and lower circulation pipes 7 are connected on the both end portions of each heat-exchanging pipe 5, the upper and lower circulation pipes 7 being connected with one side of a storage tank 20, and a circulation pump 8 is disposed on the lower circulation pipe 7 so as to be operated in response to the sensed signal of the heat sensor 6.

The heat-exchanging pipe 5 is desirably disposed at a location corresponding to one half of a length of a vertical line (C-D) perpendicular to a central point (C) on a line (A-B) connecting both end points A and B of a top end of each solar collecting container 2, the line (C-D) having the same length as that of a line (A-C), when the solar collecting container 2 is viewed from the top.

Further, a light sensor 9 is disposed on the inside of the solar collecting container 2 so as to sense sunlight, and an electronic valve 10 is mounted on an end portion of each of the upper and lower circulation pipes 7 connected to the storage tank 20 in such a manner as to be opened and closed in response to the sensed signals of the heat sensor 6 and the light sensor 7. At this time, the circulation pump 8 is disposed near the heat-exchanging pipe 5. The electronic valve 10 is operated under the condition where the heat sensor 6 senses the heat when the temperature of the circulating water in the heat-exchanging pipe 5 is 10° C. or less and the light sensor senses the sunlight after sunset.

The heat sensor 6 and the light sensor 9 are disposed on any one of the plurality of solar collecting containers 2 arranged parallel to one another.

Moreover, an underground heat-exchanging pipe 11 that is adapted to be located under the ground is connected to upper and lower auxiliary pipes 12. In this case, the upper auxiliary pipe 12 extends downwardly from one end side of the upper circulation pipe 7 in such a manner as to be adjacent to the electronic valve 10, and the lower auxiliary pipe 12 extends downwardly from one end side of the lower circulation pipe 7 in such a manner as to be located between the electronic valve 10 mounted at the lower circulation pipe 7 and the circulation pump 8. An electronic valve 13 is mounted on each of the upper and lower auxiliary pipes 12 in such a manner as to be opened and closed in response to the sensed signals of the heat sensor 6 and the light sensor 9.

Also, a controller 14 controls the operations of the heat sensor 6, the light sensor 9, the circulation pump 8, and the electronic valves 10 and 13.

FIGS. 5 and 6 show a second embodiment of the present invention, wherein a solar collection-inducing plate 15 is extended inclinedly forwardly from the both front sides of each solar collecting container 2, the solar collection-inducing plate 15 having an internal angle α of 90° or less, which enables the solar collecting efficiency to be optimally obtained.

In the preferred embodiments of the present invention, the solar collecting container 2 is of a semi-cylinder, but if necessary, it may be of a semi-sphere.

The semi-cylindrical solar collecting apparatus 1 for a solar boiler according to the present invention, under the construction as mentioned above, is installed on a wall surface or a roof of a building, and next, an explanation on the operation of the semi-cylindrical solar collecting apparatus for a solar boiler according to the present invention will be given.

The present invention is directed to a device for heating circulating water to be stored in the storage tank 20 by using solar heat, and if sunlight is provided to the solar collector 1 of this invention at a state where power is applied to each of the parts by the control of the controller 14, the light sensor 9 first senses the sunlight, thereby allowing the electronic valve 10 disposed on the upper and lower circulation pipes 7 to be opened.

At this state, the sunlight is reflected onto the solar collecting plates 2a formed on the inner surfaces of the semi-cylindrical solar collecting containers 2, and as shown in FIG. 4, the reflected light is concentrated on the heat-exchanging pipes 5, thereby rapidly heating the circulating water into the heat-exchanging pipes 5. On the other hand, in the second embodiment of the present invention, as shown in FIG. 6, the sunlight is induced to the solar collecting plates 2a by means of the solar collection-inducing plates 15 extended inclinedly forwardly from the both front sides of each solar collecting container 2, such that a great amount of sunlight can be concentrated on the heat-exchanging pipes 5.

If the circulating water in the heat-exchanging pipes 5 is heated above a temperature value set on the heat sensor 6, the circulation pump 8 is operated by the control of the controller 14, such that the heated circulating water is supplied to the storage tank 20 and the cool circulating water not heated is supplied to the heat-exchanging pipes 5. The above-mentioned operations are carried out periodically, thereby heating the circulating water in the storage tank 20.

On the other hand, the light sensor 9 senses the darkness at sunset after the circulating water in the storage tank 20 is heated by using the sunlight in the daytime, and in response to the sensed signal of the light sensor 9, the electronic valve 10 mounted on each of the upper and lower circulation pipes 7 is closed by the control of the controller 14.

At this state, the heat-exchanging pipes 5 and the upper and lower circulation pipes 7 may be frozen and burst in the winter season, unlike spring and fall seasons, and therefore, if the temperature of the circulating water falls under 5° C., the heat sensor 6 senses it and sends the sensed signal to the controller 14. The electronic valve 13, which is mounted on the upper and lower auxiliary pipes 12 each connected to the underground heat-exchanging pipe 11 located under the ground and also connected between the electronic valve 10 and the upper circulation pipe 7 and between the electronic valve 10 and the circulation pump 8, is opened and at the same time, the circulation pump 8 is operated. At this time, the circulating water in the underground heat-exchanging pipe 11, which is kept at a temperature in a range between 13° C. and 15° C. by the heat of the earth, is supplied to the heat-exchanging pipes 5, thereby solving the frozen and burst problems of the heat-exchanging pipes 5 and the upper and lower circulation pipes 7.

INDUSTRIAL APPLICABILITY

As described above, the semi-cylindrical solar collecting apparatus for a solar boiler according to the present invention is provided with the heat-exchanging pipes 5 that are passed in an axial direction through the semi-cylindrical solar collecting containers 2 each having the solar collecting plate 2a formed on the inner surface thereof, and with the underground heat-exchanging pipe 11 that is located under the ground for preventing the heat-exchanging pipes 5 from being frozen and burst. The semi-cylindrical solar collecting apparatus of this invention is installed on the wall surface or roof of a building, without any restriction on a place, and even if the height of the sun is varied, as shown in FIGS. 4 and 6, the formation of the semi-cylindrical solar collecting plates 2a and the solar collection-inducing plates 15 enables the solar collection efficiency to be optimally obtained. Moreover, the circulating water in the heat-exchanging pipes 5 that is passed through the solar collecting containers 2 is heated through the underground heat-exchanging pipe 11, such that the frozen and burst problems of the heat-exchanging pipes 5 can be completely solved.

The invention claimed is:

1. A semi-cylindrical solar collecting apparatus (1) for a solar boiler, comprising:
   at least one solar collecting container (2) having a semi-cylindrical shape closed at both end portions thereof by means of a side wall (3);
   a solar collecting plate (2a) disposed along the inner surface of the at least one solar collecting container (2), the solar collecting plate (2a) being formed of a mirror for reflecting sunlight;
   a transparent cover (3) adapted to close the front surface of the at least one solar collecting container (2);
   a heat-exchanging pipe (5) axially mounted in the at least one solar collecting container to pass through the at least one solar collecting container (2);
   a heat sensor (6) embedded into the heat-exchanging pipe (5) of the at least one solar collecting container (2) so as to sense a temperature of circulating water;
   upper and lower circulation pipes (7) connected to one side of a storage tank (20) so as to connect the upper and lower end portions of each heat-exchanging pipe (5) with the storage tank (20);
   a circulation pump (8) mounted at one side of the lower circulation pipe (7) connected to the storage tank (20) so as to be operated in response to the sensed signal of the heat sensor (5);
   a light sensor (9) disposed on the inside of the at least one solar collecting container (2) so as to sense sunlight;
   a first electronic valve (10) mounted on an end portion of each of the upper and lower circulation pipes (7) connected to the storage tank (20) in such a manner as to be opened and closed in response to the sensed signals of the light sensor (9) such that the first electronic valve is closed in response to the light sensor sensing darkness;
   an underground heat-exchanging pipe (11) adapted to be located under the ground in such a manner as to be connected to upper and lower auxiliary pipes (12), the upper auxiliary pipe (12) extending downwardly from one end side of the upper circulation pipe (7) in such a manner as to be adjacent to the electronic valve (10), and the lower auxiliary pipe (12) extending downwardly from one end side of the lower circulation pipe (7) in such a manner as to be located between the electronic valve (10) mounted at the lower circulation pipe (7) and the circulation pump (8);
   a second electronic valve (13) mounted on each of the upper and lower auxiliary pipes (12) in the semi-circular top and bottom such a manner as to be opened and closed in response to the sensed signals of the heat sensor (6) such that the second electronic valve is opened when the heat sensor senses a temperature below a predetermined temperature; and
   a controller (14) for controlling the operations of the heat sensor (6), the light sensor (9), the circulation pump (8), and the first and second electronic valves (10 and 13).

2. The semi-cylindrical solar collecting apparatus for a solar boiler according to claim 1, wherein the heat-exchanging pipe (5) is disposed at a location corresponding to one half of a length of a vertical line (C-D) perpendicular to a central point (C) on a line (A-B) connecting both end points A and B of a top end of the at least one solar collecting container (2), the line (C-D) having the same length as that of a line (A-C), when the at least one solar collecting container (2) is viewed from the top.

3. The semi-cylindrical solar collecting apparatus for a solar boiler according to claim 1, wherein a solar collection-inducing plate (15) is extended inclinedly forwardly from the both front sides of the at least one solar collecting container (2), the solar collection-inducing plate (15) having an internal angle ($\alpha$) of 90° or less.

* * * * *